United States Patent
Chinnamgari et al.

(10) Patent No.: US 12,147,463 B2
(45) Date of Patent: Nov. 19, 2024

(54) METHOD FOR ADDRESS MATCHING AND RELATED ELECTRONIC DEVICE

(71) Applicant: Maersk A/S, Copenhagen K (DK)

(72) Inventors: Sunil Kumar Chinnamgari, Bangalore (IN); Akilan Kothandaraman, Pondicherry (IN); Aadil Ahmad Malik, Anantnag (IN); Mrittunjoy Das, Asansol (IN)

(73) Assignee: Maersk A/S, Copenhagen K (DK)

( * ) Notice: Subject to any disclaimer, the term of this patent is extended or adjusted under 35 U.S.C. 154(b) by 0 days.

(21) Appl. No.: 18/023,928

(22) PCT Filed: Sep. 10, 2021

(86) PCT No.: PCT/EP2021/074958
§ 371 (c)(1),
(2) Date: Feb. 28, 2023

(87) PCT Pub. No.: WO2022/058246
PCT Pub. Date: Mar. 24, 2022

(65) Prior Publication Data
US 2023/0315769 A1    Oct. 5, 2023

(30) Foreign Application Priority Data

Sep. 15, 2020    (DK) .............................. PA202070594

(51) Int. Cl.
*G06F 7/00*    (2006.01)
*G06F 16/33*    (2019.01)

(52) U.S. Cl.
CPC ............................... *G06F 16/3344* (2019.01)

(58) Field of Classification Search
CPC ............. G06F 16/3344; G06F 16/3334; G06F 16/24578; G06F 16/9014; G06F 16/215;
(Continued)

(56) References Cited

U.S. PATENT DOCUMENTS 10,410,225 B1 *   9/2019   Johnston ............ G06Q 30/0201
10,558,738 B1 *   2/2020   Strimel ................... G10L 15/26
(Continued)

FOREIGN PATENT DOCUMENTS

CN          111310456 A         6/2020

OTHER PUBLICATIONS

Danish search report dated Mar. 31, 2021, for Danish Application No. PA 202070594.
(Continued)

*Primary Examiner* — Mohammad A Sana
(74) *Attorney, Agent, or Firm* — EIP US LLP

(57) ABSTRACT

Disclosed is a method, performed by an electronic device, for address matching. The method comprises obtaining a first data set indicative of a first address. The method comprises determining, based on the first data set, using an entity extraction technique, one or more first elements indicative of the first address. The method comprises obtaining based on at least one of the one or more first elements, a second data set. The method comprises the second data set comprises one or more second elements indicative of a second address. The method comprises applying a natural language processing, NLP, technique to the first data set and the second data set, to obtain one or more similarity scores. The method comprises obtaining a set of weights associated with corresponding first elements of the first address.

15 Claims, 5 Drawing Sheets

(58) Field of Classification Search
CPC ............. G06F 16/24558; G06F 16/902; G06F 16/90334; G06F 16/9017; G06F 40/205; G06F 40/166; G06F 40/253; G06F 40/279; G06F 40/157
See application file for complete search history.

(56) References Cited

U.S. PATENT DOCUMENTS

| | | | |
|---|---|---|---|
| 2009/0157650 A1 | 6/2009 | Chow et al. | |
| 2011/0087695 A1* | 4/2011 | Sharma | G06F 40/279 707/769 |
| 2013/0311448 A1* | 11/2013 | Thompson | G06F 16/902 707/E17.014 |
| 2019/0158530 A1* | 5/2019 | Emigh | H04N 19/48 |
| 2019/0304575 A1* | 10/2019 | Beltre | G16H 40/20 |
| 2019/0378496 A1 | 12/2019 | Yasuda et al. | |

OTHER PUBLICATIONS

International Search Report dated Nov. 29, 2021 for PCT Application No. PCT/EP2021/074958.

Shreyas Mangalgi et al., "Deep Contextual Embeddings for Address Classification in E-commerce", arxiv.org, Cornell University Library, Jul. 6, 2020 (Jul. 6, 2020), XP081717073.

Nosheen Abid et al., "DeepParse: A Trainable Postal Address Parser", 2018 Digital Image Computing: Techniques and Applications (DICTA). IEEE, Dec. 10, 2018 (Dec. 10, 2018), pp. 1-8, XP033503504.

Anne Moshyedi et al., "A Combined Semantic Search and Machine Learning Approach for Address Entity Resolution", Search and Machine Learning Approach for Address Entity Resolution, Mar. 15, 2019 (Mar. 15, 2019), XP055863327.

\* cited by examiner

METHOD FOR ADDRESS MATCHING AND RELATED ELECTRONIC DEVICE

CROSS-REFERENCE TO RELATED APPLICATIONS

This application is a 371 of International Application No. PCT/EP2021/074958, filed Sep. 10, 2021, which claims priority to Danish Application No. PA202070594, filed Sep. 15, 2020 under 35 U.S.C. § 119(a). Each of the above-referenced patent applications is incorporated by reference in its entirety.

The present disclosure pertains to the field of transport and freight. The present disclosure relates to a method for address matching and related electronic device.

BACKGROUND

In a shipping cycle, once a booking is confirmed, Shipping Instructions, SI, are submitted by a customer. The SI may be further used to create Bill of Lading, B/L. The SI can be seen as a key document containing shipping details. The SI includes a section called Party Information which carries details on the Shipper, the Consignee, the First Notify Party, and their corresponding postal addresses. The addresses mentioned may already be present in a customer database. The addresses of the SI may be mapped with the addresses in the database.

However, not all the addresses can be successfully mapped. Some addresses are provided with variations (e.g. change in arrangement of text, typographies, errors, misspelled and/or truncated addresses, etc.) and cannot be identified. The time in handling such erroneous addresses is significant, and may lead to an inconsistent handling of the erroneous addresses. Manual handling is prone to error, costly and time consuming.

SUMMARY

There is a need for supporting the technical process of processing address data. There is a need for a tool which supports address matching and reduces the time to handling erroneous addresses while maintaining and/or improving accuracy and consistency. For example, the disclosed technique enables an automated identification, and matching of addresses between two sources.

Accordingly, there is a need for an electronic device and a method for address matching, which mitigate, alleviate or address the shortcomings existing and provides an automated and more time efficient address identification and address matching with an improved accuracy, an improved coverage and consistency.

Disclosed is a method, performed by an electronic device, e.g. for address matching. The method comprises obtaining a first data set indicative of a first address. The method comprises determining, based on the first data set, using an entity extraction technique, one or more first elements indicative of the first address. The method comprises obtaining, based on at least one of the one or more first elements, a second data set. The method comprises the second data set comprises one or more second elements indicative of a second address. The method comprises applying a natural language processing, NLP, technique to the first data set and the second data set, to obtain one or more similarity scores. The method comprises obtaining a set of weights associated with corresponding first elements of the first address. The method comprises determining, based on the set of weights, a match parameter indicative of a match between at least one of the one or more first elements and at least one of the one or more second elements. The method optionally comprises outputting the match parameter.

Disclosed is an electronic device comprising memory circuitry, processor circuitry, and interface circuitry, wherein the electronic device is configured to perform any of the methods disclosed herein.

Disclosed is a computer readable storage medium storing one or more programs, the one or more programs comprising instructions, which when executed by an electronic device with a display and a touch-sensitive surface cause the electronic device to perform any of the methods disclosed herein.

It is an advantage of the present disclosure that the disclosed electronic device and method provide an automated and more time efficient address identification and address matching with improved accuracy, coverage and consistency. Consequently, using the disclosed technique, a faster address correction may be achieved. This leads to a more robust handling of SI, and of an address correction in the SI.

The present disclosure provides, in one or more embodiments, a technique in which data related to addresses are stored, retrieved and processed, which improves the storage space used, the accuracy and coverage of the address matching and the speed of processing a SI.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1A:
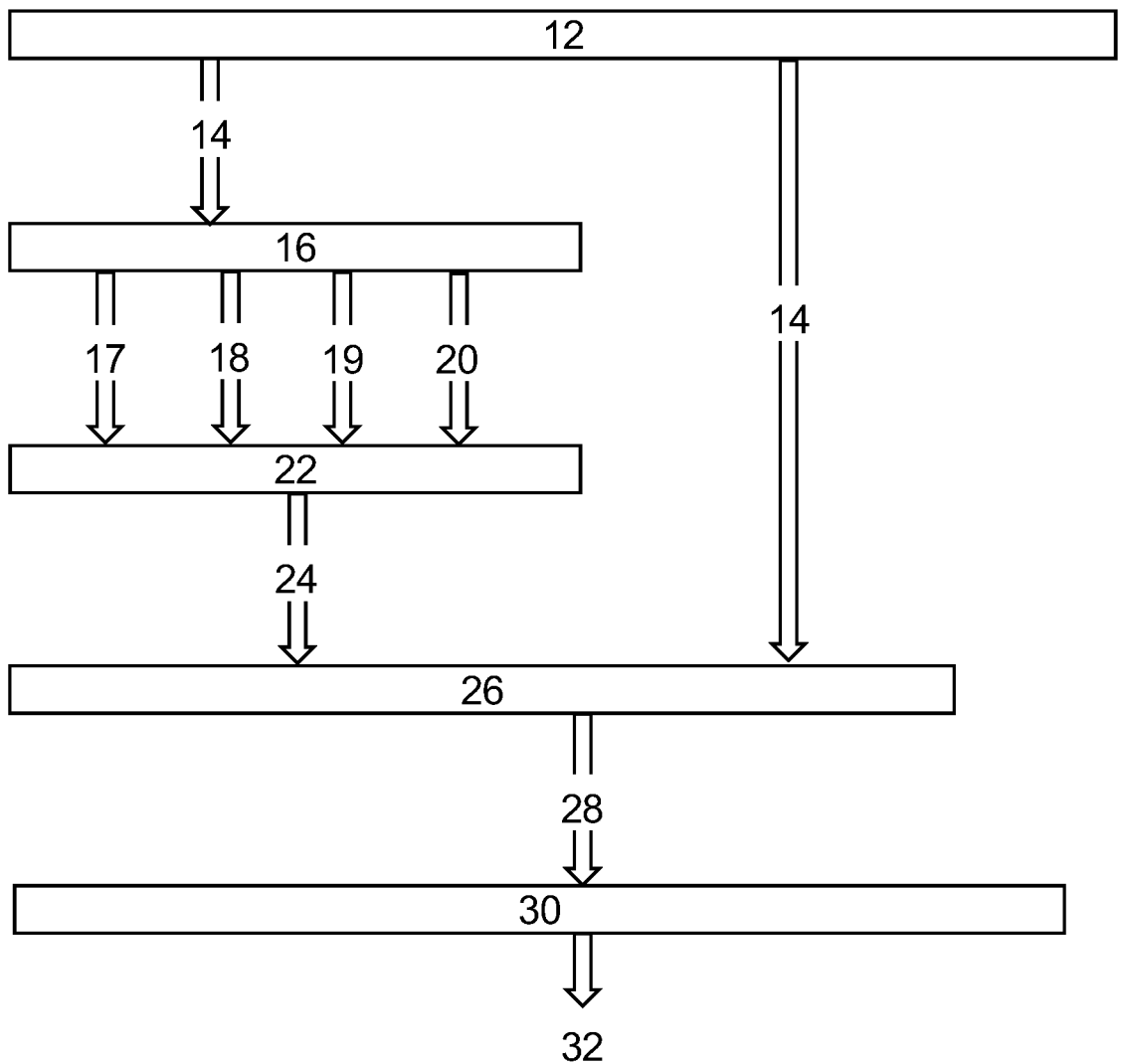
FIGS. 1A-1B are diagrams illustrating schematically a process where the disclosed technique is carried out by an example electronic device according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

Figure 1B:
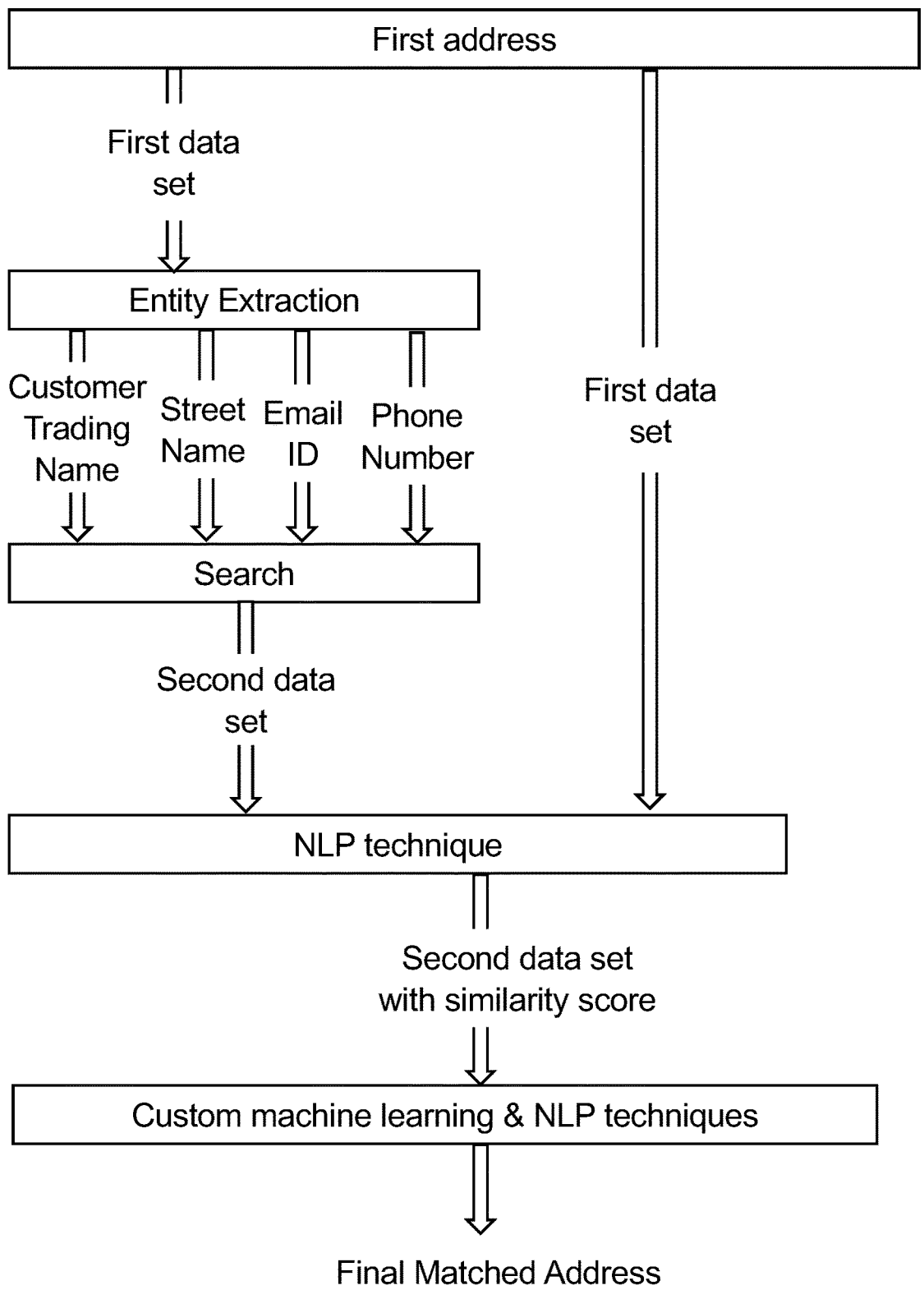

FIGS. 1A-1B are diagrams illustrating schematically a process where the disclosed technique is carried out by an example electronic device according to this disclosure FIG. 1A shows a first data set 14 indicative of a first address 12 which is obtained. For example, the first data set 14 indicative of the first address 12 may be obtained from a shipping instruction. The first address 12 may be seen as an input address. A source and/or a structure of the first data set may be a shipping instruction. For example, the first data set may be obtained based on a Customer Address which is a free text provided by a customer in Shipping Instructions as input.

An example of the first data set indicative of the first address may be in form of: A&B COMPANY (XXXXXX) CO. LTD. ROOM XXXXX FLOOR 6 PRIME NO. 1361 ORTH XXXXXX ROAD XXXXX DISTRICT XXXXX 857578 XXXXX CONTACT: MR. XXXXX TEL: XX XX XXXXX EMAIL: XXXXX@XXX.COM XXXXXX TAX REFERENCE: XXXXXXXXXXXX One or more first elements 17, 18, 19, 20 indicative of the first address 12 are determined based on the first data set 14, using an entity extraction technique 16.

A second data set 24 is obtained based on at least one of the one or more first elements 17, 18, 19, 20, e.g. by performing a search 22. The second data set 24 comprises one or more second elements indicative of a second address. The second data set 24 may be seen as comprising corresponding database matches (such as database matches corresponding to the first address).

In other words, the first address, as input address, comprises one or more first elements that may be extracted as entities such as customer trading name, street name, city, country, phone number, email ID and tax reference number. The entities are extracted using an NLP technique and used to search for the matching address in customer database to generate the second data set. The different entities are searched across the customer database and as the first level of search results, for example, the 50 closest matching addresses are retrieved and form part of the second data set as second addresses.

A natural language processing, NLP, technique 26 is applied to the first data set 14 and the second data set 24, to obtain one or more similarity scores 28. The retrieved second addresses of the second data set are compared with the first address using the NLP technique, such as an approximate sentence matching technique to arrive at a similarity score.

A similarity score may be seen as a parameter indicative of the similarity between a first element and a second element e.g. to quantify the similarity between the first element and the second element. A similarity score is for example associated with a second element of the second data set to indicate how similar the second element is with respect to a corresponding first element. For example, a similarity score indicative of the street name may indicate how similar the second element related to the street name is with respect to the corresponding first element related to the street name.

For example, each word in the first address is given equal weightage in the NLP to arrive at the second data set with similarity scores. However, it is seen that some words add more significance, e.g. more weight, in deciding the final matching address than other words. For example, words in customer trading name influences the result more than city or country names.

The disclosed technique provides varying weights for the different words in determining a match parameter as the final match between the first element of the first address and a corresponding second element of the second address. The set of weights is obtained by a predictive analysis technique to calculate the influence of the different words of the first address in deciding the result and this may be done e.g. by analyzing many first addresses (such as thousands of first addresses) and their corresponding second addresses (such as corresponding database matches).

A set of weights associated with corresponding first elements of the first address is obtained and applied in the NLP technique in operation 30 to determine a match parameter 32 indicative of a match between at least one of the one or more first elements and at least one of the one or more second elements. In other words, the set of weights is seen as an improved set of weights, such as a set of customized weights that are tailored for the first address.

FIG. 1B shows an example embodiment illustrating the disclosed process according to aspects of this disclosure. In FIG. 1B, the first data set indicative of the first address is obtained.

One or more first elements (such as Customer Trading Name, Street Name, Email ID, Phone number) indicative of the first address are determined based on the first data set, using an entity extraction technique. For example, the first address (e.g. from physical documents) is fed into the system through PDF extraction or similar tools. The first address comprises a plurality of entities like Customer trading name, Street name, Email ID, Phone Number and Tax Reference. For example, the first address is free text, the first address does not follow a specific format and may have large number of errors or anomalies. Entities are extracted with the help of the custom address parsing algorithm.

The second data set is obtained based on at least one of the one or more first elements e.g. by performing a search 22. For example, to decrease the time complexity of the system, the similarity scores may be calculated against most probable addresses (part of the second data set) present. A search service can be used to extract the most probable set of addresses, as the second data set. The search service may be created using all the addresses present in the system. The extracted entities from the first address parsing are used as criteria in the search.

A natural language processing, NLP, technique, such as Cosine Similarity is applied to the first data set and the second data set, to obtain one or more similarity scores associated with corresponding second elements of the second data set. The second data set returned from the search service and the first address are fed to NLP technique, such as a Cosine Similarity Algorithm. The NLP technique calculates similarity scores associated with the second elements forming the second data set, such as cosine similarity scores for each records in the second data set.

A set of weights associated with corresponding first elements of the first address is obtained and applied in the NLP technique in custom machine learning and NLP technique to determine e.g. a final matched address optionally with an altered similarity score. For example, an influencing factor of different words of the first address on the result are calculated by processing historical data using the logistic regression model to generate the set of weights.

It is to be noted that cosine similarity measures the similarity between two documents. A document can be defined as an address or a sentence or a paragraph. The default cosine similarity algorithm gives equal weightage to all words in the input document to decide on the final match.

But in practice, different words in the document have varying influence in deciding the result. The present disclosure leverages on regression analysis to come up with custom weights for each token or word in the input in order to arrive at a desired result. The disclosed technique leads to results with 99% precision (compared to 95% by traditional cosine similarity) and boost the recall of matched address to 80% (compared to 70%).

In other words, once the normal similarity score is obtained using the NLP technique, the next step is to obtain refined similarity score using custom weights for the set of output addresses obtained. For example, the top address (e.g. with highest refined similarity score is considered as final output). For the final matched address, if the refined similarity score is equal or greater than 0.5, then the final output is considered as a Match, else if the score is less than 0.5, then we declare that no Matching address is found.

Figure 2A:
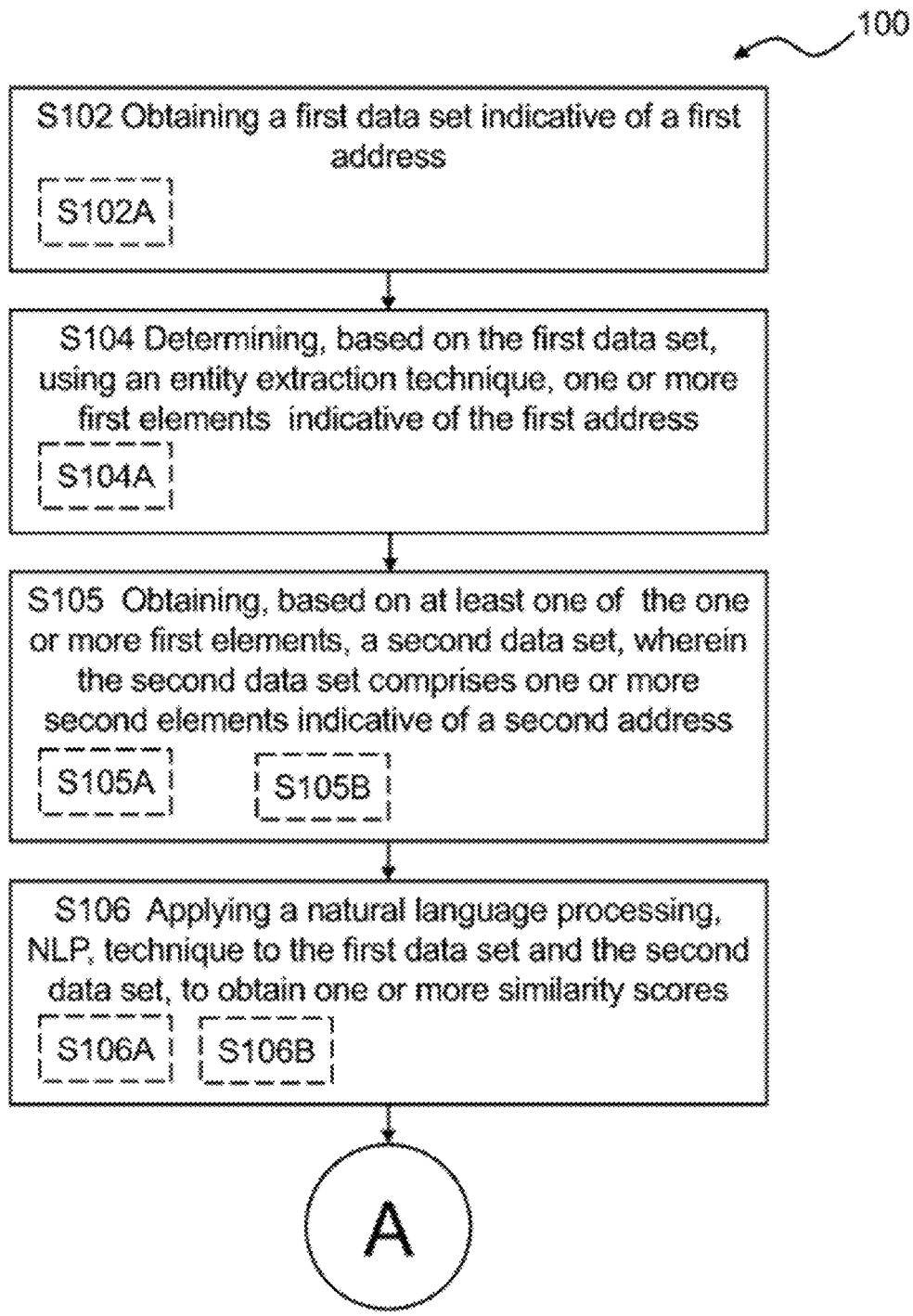
FIG. 2A is a flow-chart illustrating an exemplary method, performed by an electronic device, for address matching according to this disclosure.
Figure 2B:
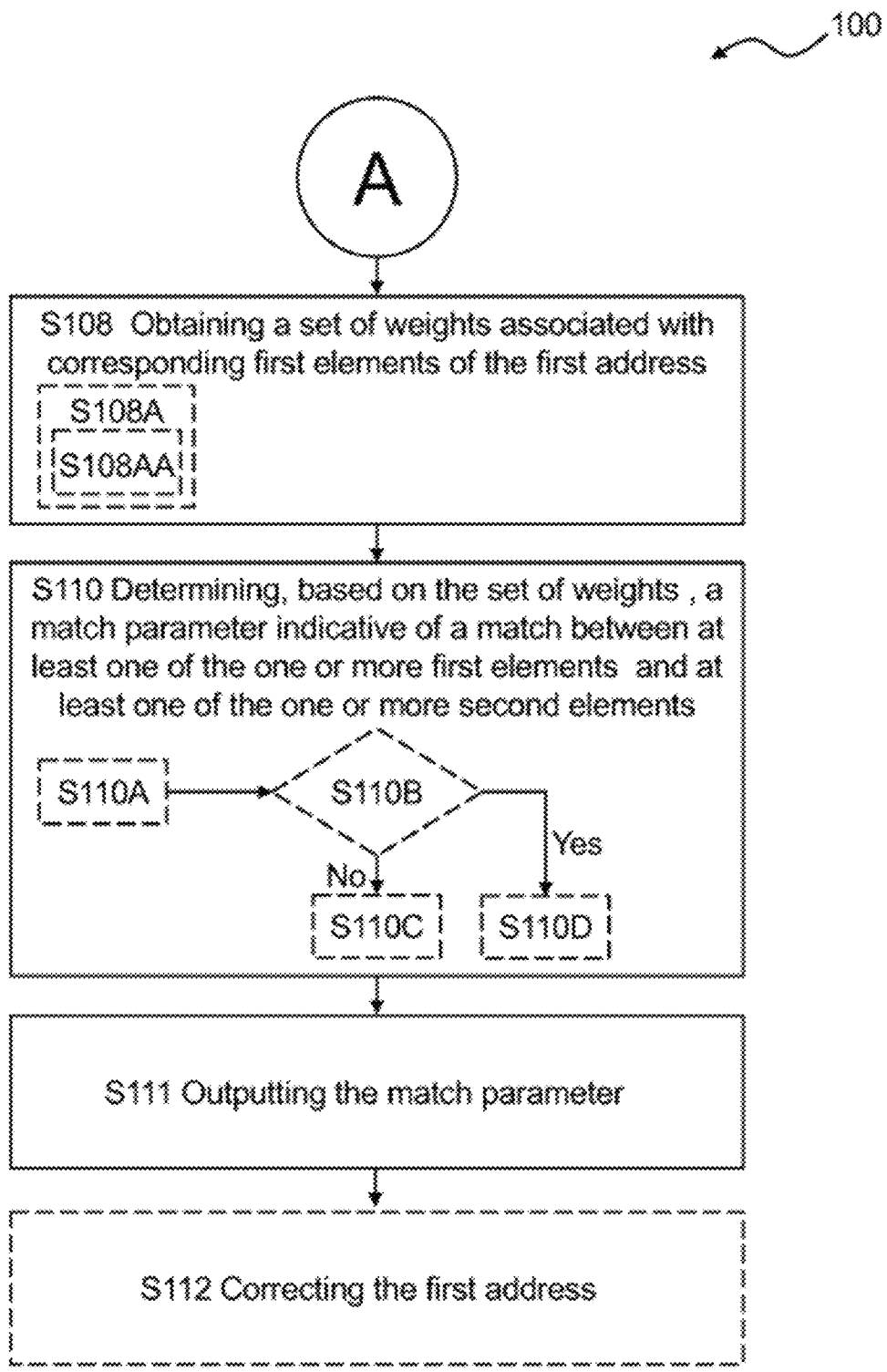
FIG. 2B is a flow-chart illustrating an exemplary method, performed by an electronic device, for address matching according to this disclosure.
Figure 3:
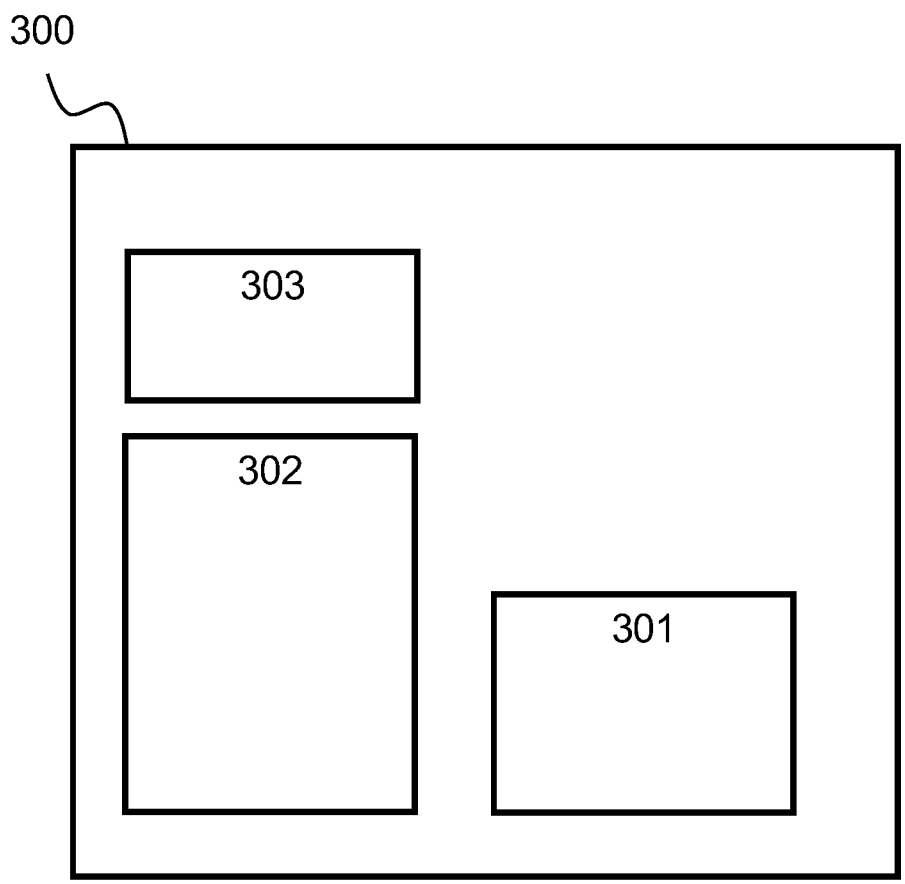
FIG. 3 is a block diagram illustrating an exemplary electronic device according to this disclosure.

FIG. 2 shows a flow diagram illustrating an example method 100, performed by an electronic device (such as an electronic device disclosed herein, such as electronic device 300 of FIG. 3), for address matching according to this disclosure. The electronic device comprises memory circuitry, processor circuitry, and an interface. The disclosed method may be seen as a method for matching text strings. The disclosed technique may be applicable to any type of text string, including text strings which are not addresses.

The method 100 comprises obtaining S102, (e.g. via the interface, and/or the processor circuitry), a first data set indicative of a first address. For example, the first data set indicative of the first address may be obtained from a shipping instruction. The first address may be seen as an input address. For example, a first data set may be extracted from the shipping instructions. In one or more example methods, obtaining S102 the first data set comprises obtaining S102A (e.g. retrieving and/or receiving), (e.g. via the interface, and/or the processor circuitry), the first data set from one or more first systems. In one or more example methods, the one or more first systems are operation systems. In one or more example methods, the one or more operation systems comprise one or more of: a shipment system, an invoicing system, and a case management system.

The method 100 comprises determining S104, (e.g. via the processor circuitry), based on the first data set, using an entity extraction technique, one or more first elements indicative of the first address. An entity extraction technique may be seen as an information extraction technique that can automatically extract entities from unstructured and/or semi-structured machine-readable text or documents and other electronically represented sources.

For example the one or more first elements may be seen as one or more first entities resulting from the entity extraction technique. In one or more example methods, the entity extraction technique comprises one or more of: a parsing technique, and an element extraction technique. For example, the entity extraction technique may use delimiters, e.g. to parse the first data set. For example, the entity extraction technique may use optical character recognition, OCR. For example, the entity extraction technique may use named entity recognition, NER (e.g. training a model with dictionary of entities). For example, delimiters can be used to extract different entities.

The method 100 comprises obtaining (e.g. retrieving and/or receiving) S105, (e.g. via the interface, and/or the processor circuitry), based on at least one of the one or more first elements, a second data set. The second data set comprises one or more second elements indicative of a second address. The one or more second elements may be indicative of one or more second addresses. In one or more example methods, at least one (e.g. less than all) of the one or more first elements is selected to obtain the second data set. In one or more example methods, obtaining S105, based on at least one of the one or more first elements, the second data set comprises searching S105A, (e.g. via the processor circuitry), one or more second systems using one or more search criteria. In one or more example methods, the one or more search criteria are based on the one or more first elements. For example, the one or more second systems are searched to generate the second data set. For example, the second data set may be seen as a search result set obtained using a search based on selected entities. In other words, addresses of the one or more second systems are filtered out to obtain fewer second elements. In one or more example methods, obtaining S105, based on at least one of the one or more first elements, a second data set, comprises obtaining S105B, (e.g. via the interface, and/or the processor circuitry), based on at least one of the one or more first elements, a second data set, from the one or more second systems. In one or more example methods, the one or more second systems comprise a customer management system and/or a customer database.

The method 100 comprises applying S106, (e.g. via the processor circuitry), a natural language processing, NLP, technique to the first data set and the second data set, to obtain one or more similarity scores. An NLP technique may be seen as a computational technique that can process and analyse natural language data in discourse such as speech or text. In the present disclosure, the NLP technique is applied to text. In one or more example methods, applying S106 the NLP technique to the first data set and the second data set, to obtain the one or more similarity scores comprises comparing S106A, (e.g. via the processor circuitry), using an approximate sentence matching technique, the one or more first elements and one or more second elements of the second data set. In other words, for example, one or more normal cosine similarity scores of the one or more second elements of the second data set (e.g. address list obtained from the search) are obtained.

The method 100 comprises obtaining S108, (e.g. via the interface, and/or the processor circuitry), a set of weights associated with corresponding first elements of the first address. In one or more example methods, obtaining S108 the set of weights comprises applying S108A, based on the first data set and the second data set, a logistic regression model to the one or more similarity scores, and optionally using historical similarity scores, to obtain a set of weights. Historical similarity scores are seen as previous similarity scores. LR may be used to model the probability of a certain class or event existing such as pass/fail, match/no match. LR may be used to model several classes of events such as determining whether an address contains a certain street name, etc. Each element being detected in the address may be assigned a probability between 0 and 1, with a sum of one.

In one or more example methods, applying S108A, (e.g. the processor circuitry), the logistic regression model to the one or more similarity scores to obtain the set of weights comprises determining S108AA, (e.g. via the processor circuitry), the set of weights based on a comparison of at least one of the first elements, and a corresponding second element.

The one or more similarity scores are obtained in S106 by giving equal weightage on all second elements in the second data set. In the present disclosure, the set of weights may be seen as custom weights on the second elements of the second data set to get refined similarity scores. For example, the set of weights is generated using Logistic Regression (LR) not during run time (e.g. not performed at every other address matching). The LR is performed for example once in a while when the set of weights are trained, such as a one-time activity. A weight may be derived based on LR model in that if there exists a match, this contributes to the weight.

For example, the input to LR comprises dependent variables and independent variables, and the LR outputs the set of weights for the second elements of the second data set (such as all entities in the first and/or second address). The independent variables indicate the presence of different elements (e.g. entities) in the address (e.g. comparing input and final matching output). The independent variables comprise similarity scores. The dependent variables indicate a status of final match (e.g. Match or No Match) comparing the first address and the second address, e.g. final matching output. The final matching output may be evaluated by a manual audit.

In some embodiments, the LR and/or the NLP may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, report data, and/or numerical analysis. The machine learning programs may utilize deep learning algorithms that may be primarily focused on pattern recognition, and may be trained after processing multiple examples. The machine learning programs may include object recognition, optical character recognition, and/or natural language processing—either individually or in combination. The machine learning programs may also include natural language processing, semantic analysis, and/or automatic reasoning.

In supervised machine learning, a processing element may be provided with example inputs and their associated outputs, and may seek to discover a general rule that maps inputs to outputs, so that when subsequent novel inputs are provided the processing element may, based upon a discovered rule, accurately predict the correct output. In unsupervised machine learning, the processing element may be required to find its own structure in unlabelled example inputs. In some embodiments, machine learning techniques may be used to extract data about the computer device, the user of the computer device, the computer network hosting the computer device, services executing on the computer device, and/or other data.

Based upon these analyses, the processing element may learn how to identify characteristics and patterns that may then be applied to training models, analysing addresses and text strings and detecting matches.

The method 100 comprises determining S110, (e.g. via the processor circuitry), based on the set of weights, a match parameter indicative of a match between at least one of the one or more first elements and at least one of the one or more second elements. For example, the match parameter may be determined by using the set of weight in an NLP technique.

A set of weights associated with corresponding first elements of the first address is obtained and applied in the NLP technique in custom machine learning and NLP technique to determine the match parameter. The match parameter may be seen as a parameter indicative of the degree of match between the first element(s) and corresponding second element(s). The match parameter may indicate match or no match. For example, the match parameter may indicate 1 or 0 where 1 being 100% match and 0 being no match at all. For example the match parameter may indicate a number between 0 and 1 which needs to be compared to a criterion before identifying Match/No Match.

In an illustrative example where the disclosed technique is applied, a Logistic Regression is run with dependent variables (e.g. to be predicted) and independent variables (e.g. features used for predicting). Based on the features, the address match may be predicted as a success or a failure. In the example, the variables used may include one or more of: Independent Variables=['namepresent', 'addresspresent', 'emailpresent', 'phone_num_present', 'Cosine_Score', 'Azure_Search_Score', 'Count_of_Matching_numbers]; Dependent Variable=['Success']

In the example, the following equation may be carried out:

$$p=1/[1+\exp(-a-B0X0-B1X1-B2X2-B3X3-B4X4-B5X5-B6X6)]$$

Where p is a probability that may be representative of a match parameter (When p>=0.5 Pass [Success=1], When p<0.5 Fail [Success=0]), a is a constant value, X0 is a value of the variable namepresent [0/1] indicating the presence of a name, X1 is a value of the variable addresspresent [0/1] indicating the presence of an address, X2 is a value of the variable emailpresent [0/1] indicating the presence of an email, X3 is a value of the variable ph_num_present [0/1] indicating the presence of phone number, X4 is value of a cosine similarity score, Cosine_Score [Varies between 0-1], X5 is a value of Azure_Search_Score [Numerical Value], X6 is a value of Count_of_Matching_numbers [numerical].

The coefficients may be seen as the set of weights obtained by applying the LR and may be as follows: B0=Dependency Coefficient of X0; B1=Dependency Coefficient of X1; B2=Dependency Coefficient of X2; B3=Dependency Coefficient of X3, B4=Dependency Coefficient of X4; B5=Dependency Coefficient of X5, and B6=Dependency Coefficient of X6. The following coefficients are for example calculated from Logistic Regression: a=−6.19; B0=2.3697863; B1=0.10784766; B2=1.49094974; B3=0.65098831; B4=5.99906035; B5=0.6030922; B6=0.97430007.

In one or more example methods, determining S110, using the set of weights, the match parameter indicative of a match at least one of the one or more first elements and at least one of the one or more second elements comprises calculating S110A, (e.g. via the processor circuitry), an updated similarity score for each second element of the second address. The updated similarity score may be seen as a refined similarity score. In one or more example methods, determining S110, using the set of weights, the match parameter comprises determining S110B whether the updated similarity score satisfies a criterion.

The criterion may be based on a threshold, wherein the criterion is satisfied when the match parameter is equal or above the threshold and wherein the criterion is not satisfied when the match parameter is below the threshold.

In one or more example methods, determining S110, using the set of weights, the match parameter comprises, when the updated similarity score is determined to satisfy the criterion, determining S110D, (e.g. via the processor circuitry), the match parameter to be a successful match between the second element of the second address and the corresponding first element of the first address. In one or more example methods, determining S110, using the set of weights, the match parameter comprises when the updated similarity score is determined not to satisfy the criterion, determining S110C the match parameter to be a failed match between the first address and the second address. For example, while calculating update or refined similarity score (s) using set of weights (e.g. custom weights), a match parameter which are less than 0.5 is termed as No Match and a match parameter equal or above 0.5 is considered as a Match.

The method 100 comprises outputting S111, (e.g. via the interface, and/or the processor circuitry), the match parameter. The output match parameter may be indicative of similarity scores updated or refined using the set of weights. For example, the match parameter may be output from a part of the processor circuitry to another part of the processor circuitry, such as from a match parameter generator circuitry to a correction circuitry of the electronic device, so that the first address can be corrected according to the match parameter. The disclosed method allows to achieve a result with 99% accuracy and with more coverage (e.g. how many addresses were covered).

In one or more example methods, the NLP technique comprises a cosine similarity technique. In one or more example methods, the one or more similarity scores are cosine similarity scores. Cosine similarity may be seen as a measure of similarity between two non-zero vectors of an inner product space (in the present disclosure a first element and a second element). Cosine similarity may be defined to equal the cosine of the angle between the two vectors, which is also the same as the inner product of the same vectors normalized to both have length 1. For example, each element may be notionally assigned a different dimension and an address may be characterised by a vector where the value in each dimension corresponds to the number of times the elements appears in the address. Cosine similarity then gives a useful measure of how similar two addresses are likely to be in terms of their elements.

In one or more example methods, applying S106, (e.g. via the processor circuitry), the NLP technique to the first data set and the second data set, to obtain one or more similarity scores comprises generating S106B, (e.g. via the processor circuitry), the one or more cosine similarity scores for each second elements of the second data set.

In one or more example methods, the method 100 comprises correcting S112, (e.g. via the processor circuitry), the first address according to the match parameter. In one or more example methods, the second address is a corrected address.

FIG. 3 shows a block diagram of an exemplary electronic device 300 according to the disclosure. The electronic device 300 comprises memory circuitry 301, processor circuitry 302, and an interface 303. The electronic device 300 is configured to perform any of the methods disclosed in FIG. 2. In other words, the electronic device 300 is configured for address matching or matching text strings. For example, the electronic device disclosed herein, such as electronic device 300, may be a shipping instruction handling device. For example, the electronic device disclosed herein, such as electronic device 300, may be an address correcting device. For example, the electronic device disclosed herein, such as electronic device 300, may be an invoice handling device.

The electronic device 300 is configured to obtain (e.g. via the processor circuitry 302) a first data set indicative of a first address.

The electronic device 300 is configured to determine (e.g. via the processor circuitry 302), based on the first data set, using an entity extraction technique, one or more first elements indicative of the first address.

The electronic device 300 is configured to obtain (e.g. via the processor circuitry 302, and/or the interface 303), based on at least one of the one or more first elements, a second data set, wherein the second data set comprises one or more second elements indicative of a second address.

The electronic device 300 is configured to apply (e.g. via the processor circuitry 302) a natural language processing, NLP, technique to the first data set and the second data set, to obtain one or more similarity scores.

The electronic device 300 is configured to obtain (e.g. via the processor circuitry 302, and/or the interface 303 and/or from the memory circuitry 301) a set of weights associated with corresponding first elements of the first address.

The electronic device 300 is configured to determine (e.g. via the processor circuitry 302), based on the set of weights, a match parameter indicative of a match between at least one of the one or more first elements and at least one of the one or more second elements.

Optionally, the electronic device 300 is configured to output the match parameter.

The processor circuitry 302 is optionally configured to perform any of the operations disclosed in FIG. 2 (such as any one or more of: S102A, S104A, S105A, S105B, S106A, S106B, S108A, S108AA, S110A, S110B, S110C, S110D, S112). The operations of the electronic device 300 may be embodied in the form of executable logic routines (e.g., lines of code, software programs, etc.) that are stored on a non-transitory computer readable medium (e.g., the memory circuitry 301) and are executed by the processor circuitry 302).

Furthermore, the operations of the electronic device 300 may be considered a method that the electronic device 300 is configured to carry out. Also, while the described functions and operations may be implemented in software, such functionality may as well be carried out via dedicated hardware or firmware, or some combination of hardware, firmware and/or software.

The memory circuitry 301 may be one or more of a buffer, a flash memory, a hard drive, a removable media, a volatile memory, a non-volatile memory, a random access memory (RAM), or other suitable device. In a typical arrangement, the memory circuitry 301 may include a non-volatile memory for long term data storage and a volatile memory that functions as system memory for the processor circuitry 302. The memory circuitry 301 may exchange data with the processor circuitry 302 over a data bus. Control lines and an address bus between the memory circuitry 301 and the processor circuitry 302 also may be present (not shown in FIG. 3). The memory circuitry 301 is considered a non-transitory computer readable medium.

The memory circuitry 301 may be configured to store the set of weights in a part of the memory.

The electronic device 300 may act as a user device in some embodiments.

In some embodiments, the electronic device 300 may act as a server device.

Embodiments of methods and products (electronic device) according to the disclosure are set out in the following items:

1. A method, performed by an electronic device, for address matching, the method comprising:
   obtaining (S102) a first data set indicative of a first address,
   determining (S104), based on the first data set, using an entity extraction technique, one or more first elements indicative of the first address;
   obtaining (S105), based on at least one of the one or more first elements, a second data set, wherein the second data set comprises one or more second elements indicative of a second address;
   applying (S106) a natural language processing, NLP, technique to the first data set and the second data set, to obtain one or more similarity scores,
   obtaining (S108) a set of weights associated with corresponding first elements of the first address;
   determining (S110), based on the set of weights, a match parameter indicative of a match between at least one of the one or more first elements and at least one of the one or more second elements; and
   outputting (S111) the match parameter.
2. The method according to item 1, wherein the entity extraction technique comprises one or more of: a parsing technique, and an element extraction technique.
3. The method according to any of the previous items, wherein obtaining (S105), based on at least one of the one or more first elements, the second data set comprises searching (S105A) one or more second systems using one or more search criteria, wherein the one or more search criteria are based on the one or more first elements.
4. The method according to any of the previous items, wherein obtaining (S108) the set of weights comprises applying (S108A), based on the first data set and the second data set, a logistic regression model to the one or more similarity scores.
5. The method according to any of the previous items, wherein applying (S106) the NLP technique to the first data set and the second data set, to obtain the one or more similarity scores comprises comparing (S106A), using an approximate sentence matching technique, the one or more first elements and one or more second elements of the second data set.
6. The method according to any of the previous items, wherein the NLP technique comprises a cosine similarity technique
7. The method according to item 6, wherein the one or more similarity scores are cosine similarity scores.
8. The method according to any of items 6-7, wherein applying (S106) the NLP technique to the first data set and the second data set, to obtain one or more similarity scores comprises generating (S106B) the one or more cosine similarity scores for each second elements of the second data set.
9. The method according to any of the previous items as dependent on item 4, wherein applying (S108A) the logistic regression model to the one or more similarity scores to obtain the set of weights comprises:
   determining (S108AA) the set of weights based on a comparison of at least one of the first elements, and a corresponding second element.
10. The method according to any of the previous items, wherein determining (S110), using the set of weights, the match parameter indicative of a match at least one of the one or more first elements and at least one of the one or more second elements comprises:
    calculating (S110A) an updated similarity scores for each second element of the second address;
    determining (S110B) whether the updated similarity score satisfies a criterion, and
    when the updated similarity score is determined to satisfy the criterion, determining (S110D) the match parameter to be a successful match between the second element of the second address and the corresponding first element of the first address.
11. The method according to any of the previous items, the method comprising correcting (a) the first address according to the match parameter.
12. The method according to any of the previous items, wherein obtaining (S102) the first data set comprises obtaining (S102A) the first data set from one or more first systems, wherein the one or more first systems are one or more operation systems, wherein the one or more operation systems comprise one or more of: a shipment system, an invoicing system, and a case management system.
13. The method according to any of the previous items, wherein obtaining (S105), based on at least one of the one or more first elements, a second data set, comprises obtaining (S105B), based on at least one of the one or more first elements, a second data set, from the one or more second systems, wherein the one or more second systems comprise a customer management system and/or a customer database.
14. The method according to any of the previous items, wherein the second address is a corrected address.
15. An electronic device comprising a memory circuitry, a processor circuitry, and a wireless interface, wherein the electronic device is configured to perform any of the methods according to any of items 1-14.
16. A computer readable storage medium storing one or more programs, the one or more programs comprising instructions, which when executed by an electronic device cause the electronic device to perform any of the methods of items 1-14.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1A-3 comprises some circuitries or operations which are illustrated with a solid line and some circuitries or operations which are illustrated with a dashed line. The circuitries or operations which are comprised in a solid line are circuitries or operations which are comprised in the broadest example embodiment. The circuitries or operations which are comprised in a dashed line are example embodiments which may be comprised in, or a part of, or are further circuitries or operations which may be taken in addition to the circuitries or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly to be regarded in an illustrative rather than restrictive sense. The claimed disclosure is intended to cover all alternatives, modifications, and equivalents.

What is claimed is:

1. A method, performed by an electronic device, for address matching, the method comprising:
   obtaining a first data set indicative of a first address,
   determining, based on the first data set, using an entity extraction technique, one or more first elements indicative of the first address;
   obtaining, based on at least one of the one or more first elements, a second data set, wherein the second data set comprises one or more second elements indicative of a second address;
   applying a natural language processing, NLP, technique to the first data set and the second data set, to obtain one or more similarity scores,
   obtaining a set of weights associated with corresponding first elements of the first address;
   determining, based on the set of weights, a match parameter indicative of a match between at least one of the one or more first elements and at least one of the one or more second elements;
   outputting the match parameter; and
   correcting the first address according to the match parameter.

2. The method according to claim 1, wherein the entity extraction technique comprises one or more of: a parsing technique, and an element extraction technique.

3. The method according to claim 1, wherein obtaining, based on at least one of the one or more first elements, the second data set comprises searching one or more second systems using one or more search criteria, wherein the one or more search criteria are based on the one or more first elements.

4. The method according to claim 1 wherein obtaining the set of weights comprises applying, based on the first data set and the second data set, a logistic regression model to the one or more similarity scores.

5. The method according to claim 4, wherein applying the logistic regression model to the one or more similarity scores to obtain the set of weights comprises:
   determining the set of weights based on a comparison of at least one of the first elements, and a corresponding second element.

6. The method according to claim 1, wherein applying the NLP technique to the first data set and the second data set, to obtain the one or more similarity scores comprises comparing, using an approximate sentence matching technique, the one or more first elements and one or more second elements of the second data set.

7. The method according to claim 1, wherein the NLP technique comprises a cosine similarity technique.

8. The method according to claim 7, wherein the one or more similarity scores are cosine similarity scores.

9. The method according to claim 7, wherein applying the NLP technique to the first data set and the second data set, to obtain one or more similarity scores comprises generating the one or more cosine similarity scores for each second elements of the second data set.

10. The method according to claim 1, wherein determining, using the set of weights, the match parameter indicative of a match at least one of the one or more first elements and at least one of the one or more second elements comprises:
    calculating an updated similarity scores for each second element of the second address;
    determining whether the updated similarity score satisfies a criterion, and
    when the updated similarity score is determined to satisfy the criterion, determining the match parameter to be a successful match between the second element of the second address and the corresponding first element of the first address.

11. The method according to claim 1, wherein obtaining the first data set comprises obtaining the first data set from one or more first systems, wherein the one or more first systems are one or more operation systems, wherein the one or more operation systems comprise one or more of: a shipment system, an invoicing system, and a case management system.

12. The method according to claim 1, wherein obtaining, based on at least one of the one or more first elements, a second data set, comprises obtaining, based on at least one of the one or more first elements, a second data set, from the one or more second systems, wherein the one or more second systems comprise a customer management system and/or a customer database.

13. The method according to claim 1, wherein the second address is a corrected address.

14. An electronic device comprising a memory circuitry, a processor circuitry, and a wireless interface, wherein the electronic device is configured to:
- obtain a first data set indicative of a first address;
- determine, based on the first data set, using an entity extraction technique, one or more first elements indicative of the first address;
- obtain, based on at least one of the one or more first elements, a second data set, wherein the second data set comprises one or more second elements indicative of a second address;
- apply a natural language processing, NLP, technique to the first data set and the second data set, to obtain one or more similarity scores,
- obtain a set of weights associated with corresponding first elements of the first address;
- determine, based on the set of weights, a match parameter indicative of a match between at least one of the one or more first elements and at least one of the one or more second elements;
- output the match parameter; and
- correct the first address according to the match parameter.

15. A computer readable storage medium storing one or more programs, the one or more programs comprising instructions, which when executed by an electronic device cause the electronic device to:
- obtain a first data set indicative of a first address;
- determine, based on the first data set, using an entity extraction technique, one or more first elements indicative of the first address;
- obtain, based on at least one of the one or more first elements, a second data set, wherein the second data set comprises one or more second elements indicative of a second address;
- apply a natural language processing, NLP, technique to the first data set and the second data set, to obtain one or more similarity scores,
- obtain a set of weights associated with corresponding first elements of the first address;
- determine, based on the set of weights, a match parameter indicative of a match between at least one of the one or more first elements and at least one of the one or more second elements;
- output the match parameter; and
- correct the first address according to the match parameter.

* * * * *